(12) United States Patent
Blackburn et al.

(10) Patent No.: US 7,568,524 B2
(45) Date of Patent: Aug. 4, 2009

(54) POLYPHENYLENE SULFIDE PROPPANTS

(75) Inventors: Jay Glenn Blackburn, Kingwood, TX (US); Waverly A. Duggar, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 12/032,522

(22) Filed: Feb. 15, 2008

(65) Prior Publication Data

US 2008/0217010 A1    Sep. 11, 2008

Related U.S. Application Data

(60) Provisional application No. 60/901,935, filed on Feb. 16, 2007.

(51) Int. Cl.
*E21B 43/267* (2006.01)
(52) U.S. Cl. .................................. 166/280.2; 166/308.3
(58) Field of Classification Search ....................... None
See application file for complete search history.

(56) References Cited

U.S. PATENT DOCUMENTS 3,363,691 A    1/1968 Gomory et al.

| | | |
|---|---|---|
| 7,255,169 B2 | 8/2007 | van Batenburg et al. |
| 7,281,580 B2 | 10/2007 | Parker et al. |
| 2005/0267001 A1 | 12/2005 | Weaver et al. |
| 2006/0048943 A1 | 3/2006 | Parker et al. |

OTHER PUBLICATIONS

Armstrong, Kevin et al., Advanced Fracturing Fluids Improve Well Economics, Oilfield Review, Autumn 1995, pp. 34-51.
American Petroleum Institute, Recommended Practices for Testing High-Strength Proppants Used in Hydraulic Fracturing Operations, API Recommended Practice 60, Second Edition, Dec. 1995, pp. 1-23, Washington, D.C., USA.
American Petroleum Institute, Recommended Practices for Testing Sand Used in Hydraulic Fracturing Operations, API Recommended Practice 56, Second Edition, Dec. 1995, pp. 1-20, Washington, D.C., USA.
International Search Report and the Written Opinion, mailed Apr. 7, 2008.
Tabor, B. J. et al., "The Crystal Structure of Poly-p-Phenylene Sulphide," European Polymer Journal, 1971, vol. 7, pp. 1127-1133.

*Primary Examiner*—Zakiya W. Bates
(74) *Attorney, Agent, or Firm*—Fletcher Yoder

(57) ABSTRACT

A system and method for delivering a slurry having a fracturing fluid and one or more proppants to a fracture in a subterranean formation. At least one proppant has PPS and produces less than 5 weight percent fines at a closure pressure of the fractured subterranean formation as determined by API RP 60. The one or more proppants are deposited into the fracture to prop the fracture.

18 Claims, 1 Drawing Sheet

POLYPHENYLENE SULFIDE PROPPANTS

CROSS-REFERENCE TO RELATED APPLICATIONS

This application claims priority to Provisional Ser. No. 60/901,935, filed Feb. 16, 2007, which is incorporated by reference herein in its entirety for all purposes.

BACKGROUND

1. Field of the Invention

The present techniques relate generally to fracturing and propping subterranean operations. In particular, the present techniques relate to proppants comprising PPS for use in subterranean formations.

2. Description of the Related Art

This section is intended to introduce the reader to various aspects of art which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fracturing (e.g. hydraulic fracturing) is a common stimulation technique used to enhance production of fluids from subterranean formations. In a typical hydraulic fracturing treatment, a fracturing fluid containing a solid proppant is injected into the wellbore at pressures sufficient to create or enlarge a fracture in the subterranean formation. The proppant is deposited in the fracture, where it remains to prop the fracture. This allows fluids which were previously unavailable for recovery (or difficult to recover) to migrate from the formation to the wellbore through the fracture. Because well productivity depends on the ability of a fracture to conduct fluids from the formation to the wellbore, fracture conductivity is an important parameter in determining the degree of success of a hydraulic fracturing treatment.

Subterranean wells (such as hydrocarbon producing wells, gas producing wells, water producing wells, and injection wells) may be stimulated by fracturing treatments. In hydraulic fracturing treatments, a fracturing fluid (e.g., a viscous fluid), which may also function as a carrier fluid, is pumped into a portion of a subterranean formation at a rate and pressure such that the subterranean formation breaks and one or more fractures are formed. Typically, particulate solids (e.g. graded sand) are suspended (or slurried) within the fracturing fluid and deposited in the fractures of the subterranean formation. These particulate solids or "proppant" (or "proppants") may serve to reduce the possibility of the subterranean formation fractures fully closing. By keeping the fracture from fully closing, the proppants (i.e., particulates) allow the formation of conductive paths for materials (e.g., water, oil, gas, hydrocarbons, waste, etc.) to flow in the subterranean formation.

Some commonly used proppants include graded sand, bauxite, ceramics, or even nut hulls. Typically, the proppant particles are placed in the fracture in a concentration such that they formed a relatively tight pack of particles. Unfortunately, the pressure utilized to form the fractures is released the fractures close upon the proppant and the proppant may become crushed or compacted. The crushing or compacting of the proppants can potentially form non-permeable or low permeability masses within the fracture and may result in decreased flow of desirable materials (e.g. oil, water, and/or gas) from the subterranean formation.

Unfortunately, material flow through the subterranean formation may be reduced by small proppants or fines resulting from the crushing of the proppants failure of the formation rock, or both, as stress builds when the fracturing pressure is released. Such stresses may cause the proppant to be compressed together such that fines are generated from the proppant particles and/or reservoir matrix. Additionally, fines composed of formation material (e.g., shale, sand, coal fines, etc.) may present similar problems. The formation fines may be produced within the fractured subterranean formation due to the stresses and forces applied to the formation during fracturing or from the release of the fracturing pressure.

In sum, the degree of success of a fracturing operation depends, at least in part, upon the strength of the proppant within the subterranean formation when the fracturing pressure is released. If the proppants are broken, the pieces of broken proppant (e.g. fines) may plug the interstitial spaces of the fractured subterranean formation and reduced the flow of material from the subterranean formation. What is needed are proppants which have the strength to resist crushing when the fracturing pressure is released from the subterranean formation.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
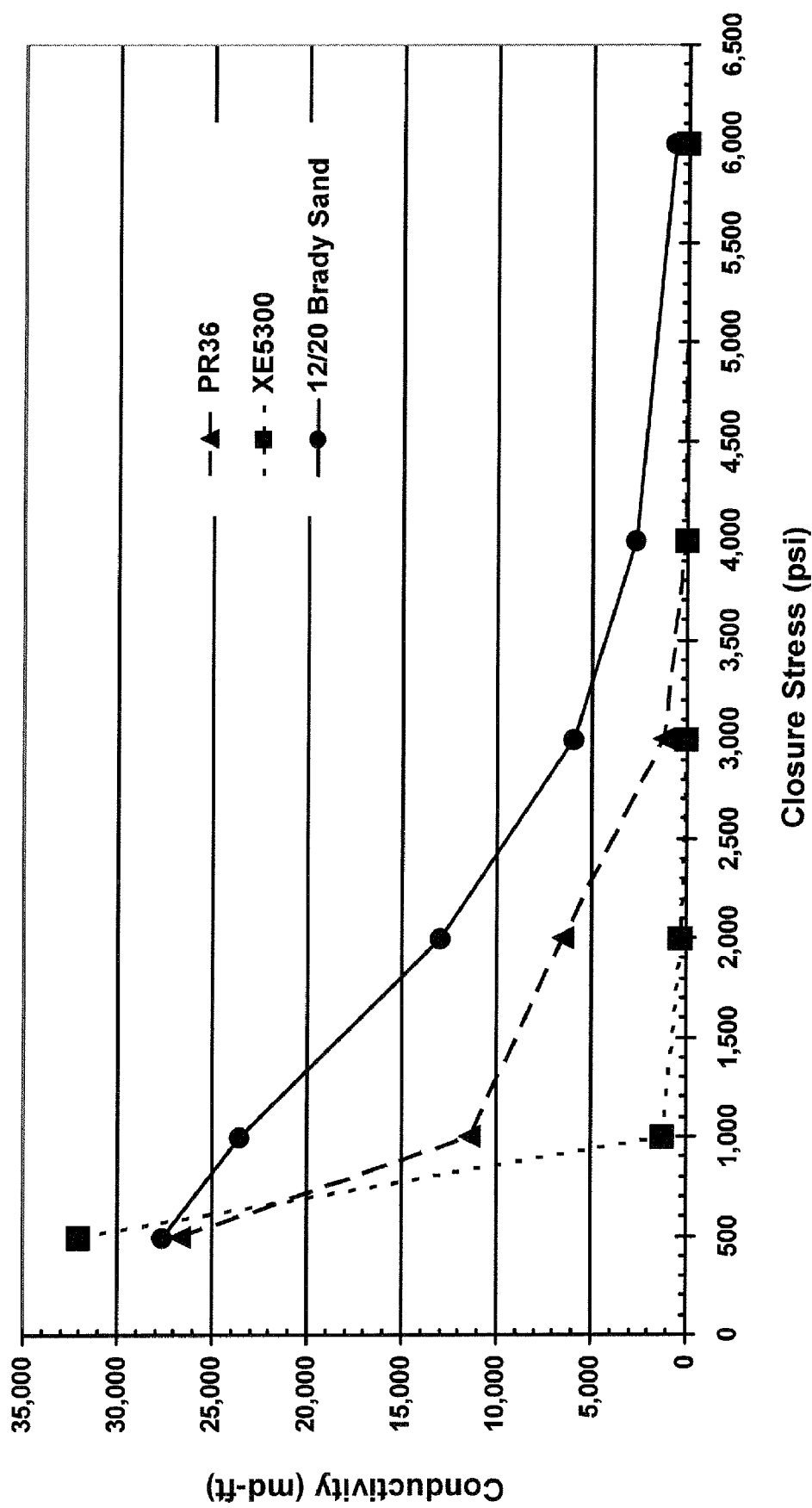
FIG. 1 is a plot depicting exemplary data for short term conductivity of two different proppants in accordance with one embodiment of the present techniques and a commonly employed proppant.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Proppants are materials used in subterranean formation fracturing processes or methods to hold open the fracture made in the subterranean formation by the fracturing process. Proppants may consist particles of materials. The term "proppant" as used herein generally refers group of particles (or a group of particles having a particular feature) and not to an individual particle, unless otherwise specified.

Fracturing is a technical operation designed to improve material production from a subterranean formation such as oil, gas, and/or water. The process involves the use of pressure to create fractures in the source rock. Proppants are delivered into these fractures to hold them open so that a material may flow through the fractured subterranean formation during the production operations. Oil and gas reservoirs with a low capacity for the flow of fluids usually require fracturing to make them commercially viable. A basic hypothesis in fracturing is that the subterranean formation production may be function of effective fracture length and effective fracture conductivity. If the fractures can be propped open, the treatment should increase subterranean formation production provided that the treatment stays within the production zone, the fracture face is not severely damaged and the fracture fluid breaks and cleans up properly.

The present disclosure describes a methods relating to the propping of subterranean formations, recovering material from a subterranean formation, and/or increasing the production of a subterranean formation. In an embodiment, the disclosure provides a method comprising delivering a slurry comprising a fluid and one or more proppants to a fractured subterranean formation; and depositing the one or more proppants to a fracture of the subterranean formation to prop the fracture. In an alternative embodiment, the disclosure provides a method comprising fracturing a subterranean formation, delivering a slurry comprising a fluid and one or more proppants to the fractured subterranean formation, and depositing the one or more proppants into the fracture. The methods described herein may be directed to method for fracturing a subterranean formation, a method of recovering material form a subterranean formation, and/or a method for increasing the production of a subterranean formation. In particular embodiment, the methods may include the step of pressurizing the subterranean formation to create a fracture. In some embodiment, the fluid of the slurry comprising a fluid and one or more proppants may be a fracturing fluid. In some embodiments, the methods include a step of recovering a material from the fractured subterranean formation. The features of methods described herein including pressurizing the subterranean formation, delivering a slurry to the subterranean formation, the fracturing fluid, the one or more proppants, the depositing of the one or more proppants into the fracture, and/or the material recovered from the fractured subterranean formation are independently described herein and may be utilized in any combination to describe the method of fracturing a subterranean formation, the method of recovering a fluid from a subterranean formation, or method of increasing the production of a subterranean formation.

A number of reservoir variables may be taken into consideration when designing and implementing a fracturing process, including reservoir pressure, reservoir temperature, the geologic nature of the reservoir, the rock properties, and the properties of the fluids to be produced. Engineers study these and other variables to avoid fracturing the surrounding formations or creating fractures of inefficient length. Generally, subterranean formation may be fractured utilizing any method capable of fracturing a subterranean formation. The subterranean formation may be fracture by pressurization with a gas; alternatively, with a fracturing fluid; or alternatively, a slurry comprising a fracturing fluid and one or more proppants. The term hydraulic fracturing or its derivatives refers to the process wherein a subterranean formation is fractured using a fluid.

In low permeability oil and gas reservoirs, conductive fractures may increase the production rate considerably. Fractures can either exist naturally in the reservoir or they can be artificially made from existing wells. The artificial fractures are created by quickly pressuring the subterranean formation. As described herein the pressurization may be accomplished by injecting a material (e.g. a fluid or gas) at high rate and pressure until the subterranean formation fractures. Proppants which may be utilized at the same time the fracturing occurs or after the fractures are formed to keep the fracture open when the pressure is released and the well is put on production. Stronger, lighter and/or more thermally stable proppants can allow for new slurries comprising fracturing fluid and one or more proppants. These new slurries can be utilized to form high conductivity fractures in subterranean formations for which current slurries do not provide an optimal conditions. Within subterranean formation which have naturally occurring or preexisting fractures, pressure by be applied to the formation to open the fracture and a proppant deposited into the fracture of keep the fracture open when the pressure is released. The methods described herein may be utilized in subterranean formations with naturally occurring or preexisting fracturing in addition to subterranean formation wherein the fracture created shortly before or simultaneously with the delivery of the proppant.

Propping agents (proppants), including naturally occurring sand, man-made intermediate and high-strength ceramics (sintered bauxite) and resin-coated sand, added to fluid systems as the subterranean formations are treated, prevent induced fractures from closing completely after pressure is released on the subterranean formation. The fracture(s) reduces radial flow pressure drop, and a linear flow pattern accelerates reservoir recovery rate. As might be expected, an improved recovery rate typically increases investment rate of return, especially in low permeability "tight" reservoirs. Fracturing treatments can also be used to improve productivity in severely damaged wells and accelerate recovery even in higher permeability reservoirs.

Fracturing stimulation treatment pumping schedules involved injection of prepad, pad, and proppant-laden fracturing and flush fluids. Thin, low-viscosity base fluids like oil, water or foam, with low gel concentrations or frictions-reducing agents, fluid loss additives and surfactants or potassium chloride to reduce formation damage, can be pumped ahead of main treatment volumes to help initiate fractures. Low-viscosity prepad stages penetrate rock matrix more easily and cool formations to reduce high-temperature gelling agent degradation.

Viscous fracturing fluid without proppants may be pumped to generate dynamic fracture width and length, and prepare fractures for proppant-laden fluid stages. Higher viscosity fluids typically reduce fluid leakoff to formations. Pad volumes should typically be sufficient to avoid leakoff before total fracture length and width have been generated and proppant has been placed. Subsequently, proppant transporting stages propagate fracture wings away from the wellbore, continue width and length generation, and carry proppants into the fracture. Maximum proppant concentrations depend on formation characteristics, fluid system type and gelling agent concentration. Efficient treatments are designed to place desired amounts of proppant with reduced fracturing fluid volumes for optimized, cost-effective stimulations. Less viscous base fluids, like prepad stages, with low friction-loss characteristics, are used to displace proppant-laden fluid stages through wellbore tubulars.

Generally, fluid utilized for the slurry comprising a fluid and one or more proppants can be any fluid suitable for delivering the one or more proppants to a fracture in a subterranean formation. In some embodiments, the fluid may be a fracturing fluid which can can be any fluid suitable for pressuring the subterranean formation and/or transporting proppant(s) into the subterranean formation. In an embodiment, the fracturing fluid may be water-based (either salt water or fresh water). In another embodiment the fracturing fluid may be oil-based (e.g. hydrocarbon). In still another embodiment, the fracturing fluid may be a supercritical gas-based (e.g. supercritical $CO_2$). In should be noted the terms "water-based," "oil-based," and "supercritical gas based" do not exclude that presence of fluids other than water, oil, and supercritical gas, respectively. The terms merely indicate the predominate fluid material present in the fracturing fluid. In fact, fracturing fluid may contain other liquid materials which or miscible or emulsified, in the predominate liquid material of the fracturing fluid, and/or ordinarily solid materials dissolved, emulsified, or slurried in the predominate liquid material of the fracturing fluid. In some embodiments, composition comprising the fracturing fluid, including but not limited to a slurry comprising a fracturing fluid and one or more proppants, may contain additional components know to those having ordinary skill in the art. Materials which may generally be present in compositions comprising a fracturing fluid include, but are not limited to, gelling agents, cross-linking agents, gel breakers, curable resins, hardening agents, solvents, surfactants, foaming agents, demulsifiers, buffers, stabilizers, bactericides, fluid loss additives, acids, salts, weighting agents, or mixtures thereof. Hydraulic fracturing fluids and operations are generally customized for each well according to its reservoir properties.

Fracturing fluid may include water, aqueous gels, viscoelastic surfactant gels, oil gels, foamed gels and emulsions, and so forth. Aqueous gels are generally comprised of water and one or more gelling agents. Emulsions can be comprised of two immiscible liquids such as an aqueous liquid or gelled liquid and a hydrocarbon. Foams can be created by the addition of a gas, such as carbon dioxide or nitrogen. In exemplary embodiments, the fracturing fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, fracturing fluid, inter alia, reduces fluid loss and allows the fracturing fluid to transport significant quantities of suspended proppant particles. The water used to form the fracturing fluid may be salt water, brine, or any other aqueous liquid that does not adversely react with the other components. The density of the water can be increased to provide additional particle transport and suspension in the present invention.

A variety of gelling agents may be used, including hydratable polymers that contain one or more functional groups such as hydroxyl, carboxyl, sulfate, sulfonate, amino, or amide groups. Suitable gelling typically comprise polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. Crosslinking agents may be used to crosslink gelling agent molecules to form crosslinked gelling agents. Crosslinkers typically comprise at least one ion that is capable of crosslinking at least two gelling agent molecules.

PPS

Within embodiments of the methods described herein, one proppant, of the one or more proppants, comprises, or consists essentially of, polyphenylene sulfide. Polyphenylene sulfide (PPS), a member of a more general class of polymers known as poly(arylene) sulfide (PAS), is a high-performance engineering thermoplastic that may be heated and molded into desired shapes in a variety of manufacturing, commercial, and consumer applications. PPS may be used in the preparation of fibers, films, coatings, injection molding compounds, and fiber-reinforced composites. PPS may be incorporated as a manufacturing component either alone or in a blend with other materials, such as other polymers, resins, reinforcing agents, additives, other thermoplastics, and the like. Initially, PPS was promoted as a replacement for thermosetting materials, but has become a suitable molding material, especially with the addition of glass and carbon fibers, minerals, fillers, and so forth. In fact, PPS is one of the oldest high-performance injection molding plastics in the polymer industry, with non-filled grades commonly extruded as wire coatings.

PPS is an attractive engineering plastic because, in part, it provides an excellent combination of properties. For example, PPS provides for resistance to aggressive chemical environments while also providing for precision molding to tight tolerances. Further, PPS is thermally stable, inherently non-flammable without flame retardant additives, and possesses excellent dielectric/insulating properties. Other properties include dimensional stability, high modulus, and creep resistance. The beneficial properties of PPS are due, in part to the stable chemical bonds of its molecular structure, which impart a relatively high degree of molecular stability. Consequently, PPS has a high degree of resistance toward thermal degradation and chemical resistance.

Generally, PPS is a polymer comprising at least 70 mole, or alternatively 90 mole % of para-phenylene sulfide units. The structure for the para-phenylene sulfide unit is provided shown below.

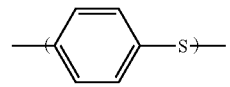

PPS may further comprise up to 30 mole %, or alternatively up to 10 mole %, of recurring units represented by one or more of the following structural formulas:

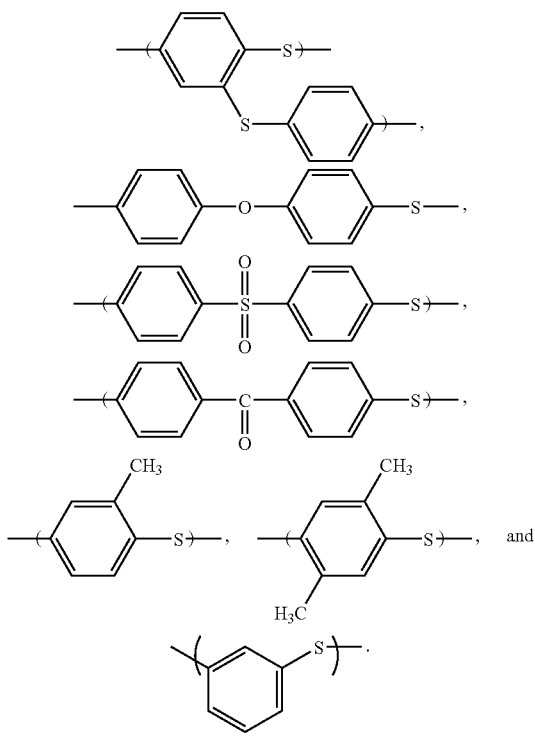

The molecular structure may readily form a thermally stable crystalline lattice, giving PPS that has a semi-crystalline morphology with a high crystalline melting point ranging from about 265° C. to about 315° C. Because of its molecular structure, PPS also tends to char during combustion, making the material inherently flame resistant. Further, the material may not typically dissolve in solvents at temperatures below about 200° C.

Generally PPS is produced by polymerizing a 1,4-dihalo benzene compound with a sulfur source. Other dihaloaromatic compounds may present during the polymerization of a 1,4-dihalobenzene compound with a sulfur source to provide the additional structure units present in PPS described herein. Additionally, halo aromatic compounds having 3 or 4 halogens may be present to providing cross-linking in the PPS structure. After termination of the PPS formation reaction and the recovery of the PPS, the recovered PPS may be cured through an oxidative heat treatment. For example, the PPS can be cured by heating at temperatures above about 150° C. in the presence of free oxygen-containing gas. Agents that affect curing, such as peroxides, accelerants, and/or inhibitors, may be incorporated into the PPS. Such cured polymer generally has high thermal stability and good chemical resistance, and is useful, for example, in the production of coatings, films, and molded objects. Additionally, the PPS polymer may ultimately be blended with various additives, such as polymers, fiber reinforcements, fillers, pigments, nucleating agents, antioxidants, UV stabilizers, heat stabilizers, carbon black, metal deactivators, lubricants, plasticizers, corrosion inhibitors, mold release agents, pigments, titanium dioxide, clay, mica, processing aids, adhesives, tackifiers, and the like. Ultimately, the PPS polymer may be formed (e.g., extruded or molded) into a desired shape or product, such as a pellet.

The PPS may be heated and molded into desired shapes and composites in a variety of processes, equipment, and operations. For example, as will be appreciated by those of ordinary skill in the art, the PPS polymer may be subjected to heat, compounding, injection molding, blow molding, precision molding, film-blowing, extrusion, and so forth.

Proppants Incorporating PPS

In an embodiment, the slurry comprising a fluid and one or more proppants delivered to the fracture in a subterranean formation in the methods described herein include one proppant comprising, or consists essentially of, PPS. In some embodiments the fluid may be a fracturing fluid. Generally, the PPS utilized in the proppant comprising PPS may be any PPS described herein. One source of PPS is that manufactured and sold under the trade name Ryton® PPS by Chevron Philips Chemical Company LP of The Woodlands, Texas. Other sources of PPS include Ticona, Toray, and Dainippon Ink and Chemicals, Incorporated among others.

Embodiments of the present techniques include proppants comprising PPS. All or part of the proppant may incorporate PPS. In other words, examples of the present proppant may range from a PPS pellet with no additives or fillers to a proppant material coated with a layer of PPS. Again, the present techniques relate to propped fractures in portions of subterranean formations, and more particularly to the production and use of proppant particulates having PPS. In some embodiments, the proppant having PPS may be coated with an adhesive, a tack material, and so on. In certain embodiments, it is desirable to employ spherical PPS proppant particles to support the cracks formed in the hydraulic fracturing.

In some particular embodiments, the proppant comprising, or consisting essentially of PPS is annealed prior to its use as a proppant. Annealing is a process by which the PPS is subjected to a temperature above its glass transition temperature but below a temperature at which the PPS begins to melt. Annealing PPS increases the degree of crystallinity of PPS. The increase in the degree of crystallinity may provide changes to the proppant comprising, or consisting essentially of, PPS which may improve its properties as a proppant (e.g. the amount of fines produced upon subjecting the proppant to the closure pressure of the fractured subterranean formation). Annealing is performed after the melt processing of the PPS (e.g. after extrusion or molding). Consequently, in some embodiments, the proppant comprising, or consisting essentially of, PPS is anneal prior its delivery to the subterranean formation.

Features which may be utilized to describe a proppant comprising PPS, either singly or in any combination, include density, mesh size, sphericity (or lack thereof), the quantity of fines created when the proppant is subjected to pressure, acid solubility, the presence of an impact modifier, and the presence of a filler, among other features. Features which may be utilized to describe a proppant consisting essentially of PPS, either singly or in any combination include density, mesh size, sphericity, and the quantity of fines created when the proppant is subjected to pressure, and acid solubility, among other features.

Generally, the density of the proppant comprising, or consisting essentially of, PPS may have a density ranging from 1.1 to 2. In some, embodiments, the density of the proppant comprising PPS may have a density ranging from 1.1 to 1.8; alternatively, from 1.1 to 1.6; alternatively, from 1.1 to 1.4. Generally, as discussed in more detail below, a lower density proppant may reduce segregation of the PPS proppant from the drilling fluid, facilitate the use of a less expensive drilling fluid (e.g., water), reducing pumping requirements of the drilling fluid, and so on.

The mesh size of the proppant comprising, or consisting essentially of, PPS may be any mesh size needed to prop a fracture. In an embodiment, the mesh size of the proppant comprising, or consisting essentially of, PPS may range from 2 to 200; alternatively, from 3 to 150; or alternatively, from 5 to 75. In some embodiments, 90 weight %, 95 weight %, or 97 weight % of a proppant comprising, or consisting essentially of, PPS may have a mesh size ranging from 6 to 12, from 8 to 16, from 12 to 20, from 16 to 30, from 20 to 40, from 30 to 50, from 40 to 60, from 40 to 70, or from 70 to 140. In other embodiments, the mesh size of a proppant comprising, or consisting essentially of, PPS may be $6/12$, $8/16$, $12/20$, $20/40$, $30/50$, $40/70$, and $70/140$ meeting the requirements of API RP 56. Within API RP 56, the mesh size stated as X/Y, provides that at least 90 weight percent of the proppant particles fall between the mesh sizes of X and Y, not more than 0.1 weight % of the proppant particulates are larger than mesh size X, and not more than 1 weight % of the proppant particles are smaller than mesh size Y. In other embodiments, the mesh size of the proppant comprising, or consisting essentially of, PPS may be $8/16$, $12/20$, $16/30$, $20/40$, $30/50$, and $40/60$ meeting the requirements of API RP 58. Within API RP 58, the mesh size stated as X/Y, provides that at least 90 weight percent of the proppant particles fall between the mesh sizes of X and Y, not more than 0.1 weight % of the proppant particulates are larger than mesh size X, and not more than 2 weight % of the proppant particles are smaller than mesh size Y. All mesh sizes provided herein refer to the mesh size as measures using the U.S Sieve Series.

In an embodiment, it may be desirable to have proppant particles which are round and or spherical. The sphericity of a proppant particle may be evaluated by method of API PR 60, Section 6.2. The roundness, of the proppant particles may be evaluated by method of API PR 60, Section 6.3. Hereafter, evaluations for sphericity and roundness will reference only API PR 60. The reader will know from this disclosure and API PR 60 which section to reference for the referenced determination. In an embodiment, the proppant particles comprising, or consisting essentially of, PPS may have a sphericity of at least 0.7, 0.8, or 0.9. In an embodiment, the proppant particles comprising, or consisting essentially of, PPS may have a roundness of at least 0.7, 0.8, or 0.9. While the proppant particles comprising, or consisting essentially of, PPS may have any combination of sphericity described herein and roundness described herein, a particularly desirable proppant comprising, or consisting essentially of, PPS may have a sphericity In other embodiments, it may be desirable to use a proppant comprising, or consisting essentially of, substantially non-spherical and/or non-round proppant particles. Suitable substantially non-spherical proppant particles may be cubic, polygonal, fibrous, or any other non-spherical and/or non-round shape. Such substantially non-spherical and/or non-round proppant particles may be, for example, cubic-shaped, rectangular shaped, rod shaped, ellipse shaped, cone shaped, pyramid shaped, or cylinder shaped. That is, in embodiments wherein the proppant particles are substantially non-spherical and/or non-round, the aspect ratio of the material may range such that the material is fibrous to such that it is cubic, octagonal, or any other configuration. The use of substantially non-spherical and/or non-round proppant particles may be desirable in some embodiments of the present invention because, among other things, they may provide a lower rate of settling when slurried into a fluid as is often done to transport proppant particles to desired locations within subterranean formations. By so resisting settling, substantially non-spherical and/or non-round proppant particles may provide improved proppant particles distribution as compared to more spherical and/or round proppant particles. In an embodiment, the non-spherical proppant particles comprising, or consisting essentially, of PPS may have any roundness but have a sphericity of less than or equal to 0.5, 0.3, or 0.1 as determined by API RP 60. In an embodiment, non-round proppant particles comprising, or consisting essentially, of PPS may have any sphericity but have a roundness of less than or equal to 0.5, 0.3, or 0.1 as determined by API RP 60. In some particular embodiments, the proppant particles may be both non-spherical and non-round. In such embodiments, the proppant particles may have any of sphericity less than or equal to 0.5 described herein in combination with any roundness less than or equal to 0.5 described herein as determined by API RP 60.

As previously stated, it is desirable to have proppant particles which do not crush and create fines when a pressure is exerted upon them when the pressure utilized to fracture the subterranean formation is released. The pressure exerted upon the proppant particles is termed the closure pressure. Generally, a desirable proppant comprising, or consisting essentially, of PPS produces less than the suggested maximum allowable fines as provided in API RP 60 when subjected to a closure pressure. The suggested maximum amount of fines as defined in API RP 60 include 25 weight percent for 12/20 proppant and 16/20 proppant, 10 weight percent fines for 20/40 proppants, and 8 percent fines for 40/70 proppants at closure pressures of 7,500 psi, 10,000 psi, 12,500 psi, and 15,000 psi. In some situations, it may be desirable to have a proppant which produces less than the API RP 60 suggested amount of fines at a specified closure pressure. Consequently, in some embodiments, a proppant comprising, or consisting essentially of, PPS of any particular mesh size described herein produces less than 20, 18, 16, 14, 10, 8, 6, 3, 2, 1, or 0.5 weight % fines at the closure pressure of the fractured subterranean formation as determined by APR RP 60 in a fractured subterranean formation having a closure pressure ranging from 1,500 to 3,000 psi, from 1,500 to 6,500 psi, from 6,500 to 11,250 psi, from 11,250 to 21,250 psi, from 11,250 to 16,250 psi, from 16,250 to 21,250 psi, or, or greater 21,250 psi. Alternatively, a proppant comprising, or consisting essentially of, PPS of any particular mesh size described herein produces less than 20, 18, 16, 14, 10, 8, 6, 3, 2, 1, or 0.5 weight % fines at the closure pressure of the fractured subterranean formation as determined by APR RP 60 in a fractured subterranean formation having a closure pressure ranging from 1,500 to 2,500 psi, from 2,500 to 3,500 psi, from 3,500 to 4,500 psi, from 4,500 to 5,500 psi, from 5,500 to 6,500 psi, from 6,500 to 8,750 psi, from 8,750 to 11,250 psi, from 11,250 to 13,750 psi, from 13,750 to 16,250 psi, from 16,250 to 18,750 psi, or from 18,750 to 21,250 psi.

Another desirable property to have in proppant particles is a resistance to solubility in acid (Acid Solubility Test) as defined in API RP 56 (Section 7). Either method a or method b, within section 7.3.1 be may be utilized to prepare the 12/3 HCl/HF mixture called for in the API RP 56 acid solubility test. Generally, desirable proppants have an acid solubility less than 5.0 weight percent as determined by API RP 56. While, the maximum desirable acid solubility is 5.0 weight %, it may be desirable for the proppant to have a maximum acid solubility less than this value. Consequently, a proppant comprising, or consisting essentially, of PPS may have and acid solubility less than 4.0, 3.0, 2.5, 2.0, 1.5., 1.0, or 0.5 weight % as determined API RP 56.

In some embodiments, it may be desirable to reinforce the proppant particulates having PPS (e.g., reinforce with glass fibers) to increase compressive force (and thus increase their resistance to a crushing or deforming force), to decrease cost, and so on. Suitable reinforcing materials include high strength particles such as bauxite, nut hulls, ceramic, metal, glass, sand, asbestos, mica, silica, alumina, and any other available material that is smaller in size than the desired, final high density plastic proppant particulate and that is capable of adding structural strength to the desired, final high density plastic proppant particulate. In some embodiments of the present invention the reinforcing material may be a fibrous material such as glass fibers or cotton fibers. Preferably, the reinforcing material is chosen so as to not unduly increase the specific gravity of the final proppant particulate. In certain embodiments, 0-30, 1 to 30, 5 to 30, 5 to 25, 5 to 15, 10 to 25, or 10 to 15 weight percent of the proppant comprising PPS may be filler material.

In some embodiments the proppant comprising PPS may be a materially different proppant coated with a composition comprising, or consisting essentially of PPS. Such proppants may be useful wherein PPS coated proppant may improved features (e.g. crush resistance, acid solubility, etc . . . ) over the feature of proppant material alone, or may have features non normally obtainable by either proppant alone. In some instances, the coating of a proppant with PPS may provide an economic advantage over utilizing either proppant on its own.

In some particular embodiments, the methods described herein utilizing a proppant comprising, or consisting essentially of, PPS may be utilized on subterranean formations comprising a zone having a temperature ranging from 10 to 225° C.; alternatively, from 80 to 225° C.; alternatively, from 80 to 210° C.; alternatively, 80 to 190° C.; alternatively, from 120 to 225° C.; alternatively, from 120 to 210° C.; alternatively, from 120 to 190° C.; alternatively, from 120 to 175° C.; alternatively, from 150 to 225° C.; alternatively, from 150 to 210° C.; alternatively, from 150 to 190° C.; or alternatively, from 150 to 175° C.

PPS in a pellet form (with or without additives and/or fillers) generally provides performance characteristics (such as compressive strength, chemical resistance, thermal resistance, etc.) beneficial for use as a proppant. For example, PPS, and its compounds and alloys, are known for their dimensional stability in various environments. They are generally chemically resistant to a variety of drilling fluids, which may be corrosive and significantly attack other proppants or plastics. PPS density may be adjusted with fillers to meet a fluid density needs (e.g. to reduce segregation of the PPS pellet from the drilling fluid). PPS may have lower specific gravity (e.g., closer to water at 1.0) compared to other proppants that allows it to be suspended longer/better in fracturing fluid, in a more aqueous drilling fluid, or in a less expensive drilling fluid. The specific gravity of the PPS may be adjusted by adjusting the amount of filler material (e.g., calcium carbonate, glass fibers, etc.) in the PPS pellet. Use of such filler materials which may be less expensive than the PPS polymer itself may reduce the cost of the PPS pellets. Moreover, a lower density may provide for less pumping requirements (of the slurry), and also may provide for better distribution of the proppants having PPS into the fracture.

PPS pellets or proppants may be formed by an extruder, which mechanically forces the PPS through a heated cylindrical barrel by means of a screw, for example. The compression that occurs in the extruder barrel creates friction, which assists in melting the PPS. The extruder mixes and devolatilizes the melted PPS material. Molten PPS may be pushed, or extruded, through a die consisting of a series of small holes in a metal (e.g., steel) plate, and is cut to form pellets. Within an extruder, control of the temperature and shear rate, for example, may reduce any degradation of the PPS. Design factors of the extruder may include the specification of the length to diameter (L/D) ratio to impart the desired shear, mixing and degassing of any moisture and volatiles. As appreciated by those of ordinary skill in the art, the flight depth of the extruder may be specified to provide a desired shear rate and associated reduction of material degradation. Moreover, maintenance of the extruder (e.g., screen change) may be implemented to avoid pressure increases in the extruder, for example.

Examples of extrusion/pelletizing systems that may be employed to extrude/pelletize the PPS. In certain embodiments, non-strand pelletizers (e.g., hot-cut underwater, air-cut underwater, etc.) may be employed. A "hot cut" underwater or an air type pelletizer may cut pellets as they extrude from the die (e.g., substantially round cut pellet an not typically cylinder as with a strand cut machine), and typically may not generate extruded solidified to be cut.

For an underwater pelletizing system, the material may be fed into an extruder or melt pump, which forces the molten polymer through a screen changer and/or polymer diverter, then through the pelletizer die plate. As the polymer emerges from the die, pellets are cut by rotating blades and are solidified by the process water flowing across the die face inside the cutting chamber. The process water transports the pellets to a centrifugal dryer where the water is removed and the dry pellets are discharged. The process water may be contained in a closed loop to reduce water loss.

Types of pelletizers include "hot face" or "hot cut" pelletizers, "cold-cutting" systems, and so on. In hot face pelletizers, the molten extruded material may be forced through holes in a circular die. An attached blade at the discharge end cuts pellets to a specific size. Types of hot-cut pelletizers may include air pelletizers, underwater pelletizers, and so forth. At the discharge of an air pelletizer, air may circulate through a cutting chamber to begin initial cooling of the pellets that are then conveyed to fluidized bed dryers for further cooling. Alternatively, the cut pellets are discharged directly into a water bath and later dried in fluidized beds or centrifugal dryers, for example. These types of machines can produce pellets at rates up to 10,000 pounds per hour or greater. Underwater pelletizers may use a cutting blade located under a stream of water where the extruded material is discharged. A downstream auxiliary drying system may be employed. Hot-cut underwater pelletizing systems can produce pellets at rates up to 50,000 pounds per hour or greater.

Cold cutting systems include dicers, strand pelletizers, and the like. These differ from hot face systems in that the pellets are generally cut after the plastic material has been extruded into a continuous strand, air or water cooled, and then dried. However, cutting extruded resin in solid form may increase noise levels and reduces cutting blade life. In addition, these systems generally require more floor space than hot face systems.

With the various type of hot and cold systems, extruder design considerations include screw design, screw diameter, flight depth, and screw length to diameter ratio (L/D), and so forth. These factors may affect the throughput rate of the extruder. Throughput can range from a few pounds to as much as 25 tons/hour. Additional extruder features may include feed hoppers, die changers, digital instrumentation and solid state control systems, and so forth. The choice of extruder will depend upon budget considerations, space availability, required throughput and production rates, and the specific properties of the PPS or PPS blend being processed.

Several factors should typically be considered to advance processing throughput and material quality of the finished pellet. Establishment of optimal processing parameters depends upon the material characteristics of the PPS resin to be pelletized. These characteristics may include temperature and pressure sensitivity, melt index and polymer density, bulk density, and levels and types of contamination, and so forth. Controlling temperature and shear rate may reduce any degradation of the PPS resin or blend. Indeed, controlling melt temperature may be beneficial to pellet quality.

PPS may be injection molded, extruded, or machined to various sizes and shapes (e.g., spherical, cylindrical, etc.) to meet the proppant performance needs. PPS may be able to be more cost effectively produced at an acceptable size by extruding pellets of specified sizes in a "hot cut" (underwater) pelletizing method to achieve a more round or substantially spherical shape as compared to other proppants or polymers, and as compared to molded plastics or to extruded strand cut plastics, for example. Advantageously, these more spherical proppant particulates (which may also be relatively larger) may generally yield increased interstitial spaces between the PPS pellets and other particulates in the fracture. PPS pellets from a strand cut are more cylindrical in shape but may also satisfy the proppant performance requirements.

PPS powder or pellets may be cured to further improve there performance properties such as compressive strength (e.g., 5,000 to 10,000 pounds per square inch as measured by a compression test or crush resistance test) or abrasion resistance. PPS may be modified with additives, such as fluoropolymer-based additives (e.g., polytetrafluoroethylene or PTFE) to improve PPS performance properties (i.e., to improve wear and abrasion resistance, modify surface tension properties, etc). This is in contrast to using sand or ceramic based proppants with higher specific gravities or size sieved to achieve an appropriate size.

In certain embodiments, a hot-cut underwater extruder pelletizer is employed to produce generally spherical-shaped PPS. In some of the embodiments, the spherical PPS pellets may have a relatively small tail. In general, use of a hot-cut underwater pelletizer (e.g., throughput of 1,000,000 pounds per day), as opposed to typical extrusion or injection molding (e.g., 50-60 pounds per day), generally processes a much greater throughput of PPS product. Such increased product rate may make more commercially viable use of PPS as a proppant.

The PPS pellet may be subsequently cured in a vessel under temperature, for example, to enhance the performance of the PPS. To implement such a cure, the PPS pellets may be exposed to nitrogen or oxygen, for example. In general, the PPS pellets during curing may further anneal or crystallize, providing additional compressive strength and chemical resistance.

In an aspect, the methods described herein and/or the proppants described herein may be utilized to increase the production a material from a subterranean formation. The material may be any material disclosed herein. In an embodiment, the production of the is increased by at least 15%, by volume. Alternatively, the production is increased by 25%, by volume; alternatively, 35% by volume; or alternatively, at least 50% by volume.

In an aspect, this disclosure relates to a fluid produced by the methods disclosed herein. In an embodiment, the disclosure relates to water, oil or gas produced by the methods disclosed herein. In some embodiments, the disclosure relates oil or gas produced by the methods disclosed herein. In other embodiments, the disclosure relates to oil produced by the methods disclosed herein.

In certain instances, the present techniques may provide for contacting reactants in a reactor to form PPS, and then extruding the PPS to form a proppant to be used in a subterranean formation. In some embodiments, the PPS may be combined with any materials described herein prior to extrusion. The extruded PPS proppant may have any properties describe herein. The extrusion may include pelletizing the PPS via one or more hot-cut underwater pelletizers. The extrusion may also include extruding the PPS with an impact modifier.

In some embodiments, the present techniques may provide for a drilling slurry comprising a fluid (e.g., fracturing fluid, drilling fluid, etc.), and a proppant incorporating PPS, wherein the proppant produces less than 5 weight percent fines at a closure pressure of the fractured subterranean formation as determined by API RP 60. The proppant may be extruded PPS. Further, the proppant may be formed via one or more hot-cut underwater pelletizers. Also, the proppant may have any properties describe herein. Lastly, the fluid in the slurry may include water.

EXAMPLES

The following examples are set forth to provide those of ordinary skill in the art with a detailed description of how the techniques claimed herein are evaluated, and are not intended to limit the scope of what the inventors regard as their invention.

The properties of various proppants were evaluated per API RP 56 and API RP 58. The two proppants of the present techniques in this example include PPS PR36 and PPS XE5300, both available from Chevron Phillips Chemical Company of The Woodlands, Texas. Other proppants evaluated for comparison include Coated Frac Sand (PolarProp 12/20), Curable Ceramic (2040 MagnaPropG2), Light Weight Ceramic (2040 DynaPropG2), Encap. Bauxite (2040HyperProp G2), Versaprop Int. Strength Ceramic, and Ultraprop Cintered Bauxite. PolarProp, MagnaProp, DynaProp, HyperProp are proppants manufactured by Santrol of Fresno, Tex.

and a subsidiary of Fairmount Minerals. Versaprop and Ultraprop are proppants manufactured by Saint Gobain of Paris, France.

As for density of the proppants, the results in grams per cubic centimeter (g/cc) in this example are 1.35 g/cc for PR36, 1.29 g/cc for XE5300, 1.65 g/cc for Coated Frac Sand (PolarProp 12/20), 2.45 g/cc for Curable Ceramic (2040 MagnaPropG2), 2.63 g/cc for Light Weight Ceramic (2040 DynaPropG2), 3.58 g/cc for Encap. Bauxite (2040HyperProp G2), 3.2 g/cc for Versaprop Int. Strength Ceramic, and 3.5 g/cc for Ultraprop Cintered Bauxite.

As for acid solubility of the proppants, PR36 had an acid solubility of 0.3%, XE5300 had an acid solubility of 0.3%, Coated Frac Sand (PolarProp 12/20) had an acid solubility of 0.3, Curable Ceramic (2040 MagnaPropG2) had an acid solubility of 0.3, Weight Ceramic (2040 DynaPropG2) had an acid solubility of 0.3, Encap. Bauxite (2040HyperProp G2) had an acid solubility of 0.3, Versaprop Int. Strength Ceramic had an acid solubility of 2.5, and Ultraprop Cintered Bauxite had an acid solubility of 1.9 as determined by API RP 56.

As for sphericity of the proppants, the results in grams per cubic centimeter (g/cc) in this example are 0.9 for PR3, 0.9 for XE5300, 0.85 for Coated Frac Sand (PolarProp 12/20), 0.9 for Curable Ceramic (2040 MagnaPropG2), 0.9 for Light Weight Ceramic (2040 DynaPropG2), 0.9 for Encap. Bauxite (2040HyperProp G2), 0.9 for Versaprop Int. Strength Ceramic, and 0.9 for Ultraprop Cintered Bauxite.

FIG. 1 depicts a plot of short term conductivity versus closure stress (psi) for PR36, XE5300, and 12/20 Brady sand. The PR36 proppant remains conductive over the depicted closure stress until about 3000 psi to 4000 psi.

API RP's 56 and 58 describe the minimum standard for proppant and gravel turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 58 describes the minimum standard for acid solubility of gravel as no more than 1 weight % loss when tested according to API RP 58 procedures.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method comprising:
   delivering a slurry comprising a fracturing fluid and one or more proppants to a fracture in a subterranean formation, wherein one proppant comprises polyphenylene sulfide (PPS), and wherein the proppant comprising PPS produces less than 5 weight percent fines at a closure pressure of the fractured subterranean formation as determined by American Petroleum Institute Recommended Practice (API RP 60), wherein the proppant comprising PPS produces less than 2 weight percent fines when the closure pressure of the fractured subterranean formation ranges from 11,250 to 21,250 pounds per square inch (psi) as determined by API RP 60; and
   depositing the one or more proppants into the fracture to prop the fracture.

2. The method of claim 1, wherein at least 95 weight percent of the proppant comprising PPS has a mesh size ranging from 5 to 70.

3. The method of claim 1, wherein the proppant comprising PPS has a sphericity of at least 0.8 and a roundness of at least 0.8 as determined by API PR 60.

4. The method of claim 1, wherein at least a majority of the proppant comprising PPS is formed via one or more hot-cut underwater pelletizers.

5. The method of claim 1, wherein the proppant comprising PPS comprises an impact modifier.

6. The method of claim 1, wherein the slurry is delivered into the fractured subterranean formation in a zone having a temperature ranging from 120 to 210° C.

7. The method of claim 1, wherein the proppant comprising PPS comprises from 1 to 30 weight % of filler material.

8. The method of claim 7, wherein the filler material comprises glass fibers.

9. The method of claim 1, wherein the proppant comprising PPS has a density of less than 1.5 g/cc.

10. A method comprising:
   delivering a slurry comprising a fracturing fluid and one or more proppants to a fracture in a subterranean formation, wherein one proppant comprises polyphenylene sulfide (PPS), and wherein the proppant comprising PPS: produces less than 5 weight percent fines at a closure pressure of the fractured subterranean formation as determined by American Petroleum Institute Recommended Practice (API RP 60), has a density of less than 1.5 grams per cubic centimeter (g/cc), has a sphericity of at least 0.8 and a roundness of at least 0.8 as determined by API RP 60, and has an acid solubility of less than 5% as determined by American Petroleum Institute Recommended Practice 56 (API RP 56);
   depositing the one or more proppants into the fracture to prop the fracture; and
   recovering a material from the fractured subterranean formation.

11. The method of claim 10, wherein the proppant comprising PPS consists essentially of PPS.

12. The method of claim 10, wherein the material comprises oil or gas, or a combination thereof.

13. The method of claim 10, wherein the fractured subterranean formation comprises a zone having a temperature ranging from 120 to 210° C.

14. The method of claim 10, comprising pressurizing the subterranean formation to create the fracture.

15. A method comprising:
   fracturing a subterranean formation;
   delivering a slurry comprising a fracturing fluid and one or more proppants to the fractured subterranean formation, wherein one proppant comprises polyphenylene sulfide (PPS) and the proppant comprising PPS produces less than 5 weight percent fines at a closure pressure of the fractured subterranean formation as determined by American Petroleum Institute Recommended Practice (API RP 60), wherein the proppant comprising PPS produces less than 3 weight percent fines when the closure pressure of the fractured subterranean formation greater than 2000 pounds per square inch (psi) as determined by API RP 60; and
   depositing the at least one proppant into the fracture.

16. The method of claim 15, wherein a production of the subterranean formation is increased by at least 15 percent, by volume.

17. The method of claim 15, wherein fracturing the subterranean formation and delivering the slurry to the subterranean formation occur simultaneously.

18. The method of claim 15, wherein the proppant comprising PPS comprises extruded PPS.

* * * * *